March 17, 1953 W. R. SCHMITZ, JR 2,631,667
STAPLE FIBER CUTTER
Filed Oct. 28, 1948 4 Sheets-Sheet 1

INVENTOR.
WILLIAM R. SCHMITZ, JR.
BY
Campbell, Brumbaugh, Free & Graves
ATTORNEYS March 17, 1953  W. R. SCHMITZ, JR  2,631,667
STAPLE FIBER CUTTER Filed Oct. 28, 1948  4 Sheets-Sheet 2

INVENTOR.
WILLIAM R. SCHMITZ, JR.
BY
Campbell, Brumbaugh, Free & Graves
ATTORNEYS March 17, 1953 — W. R. SCHMITZ, JR — 2,631,667
STAPLE FIBER CUTTER
Filed Oct. 28, 1948 — 4 Sheets-Sheet 3
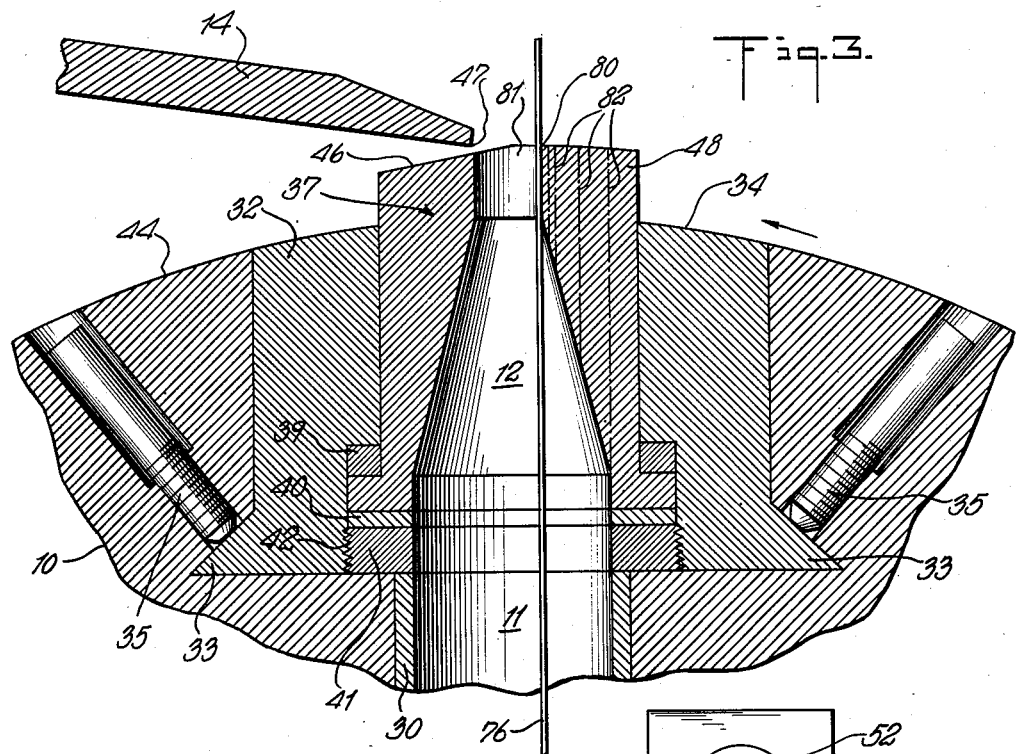
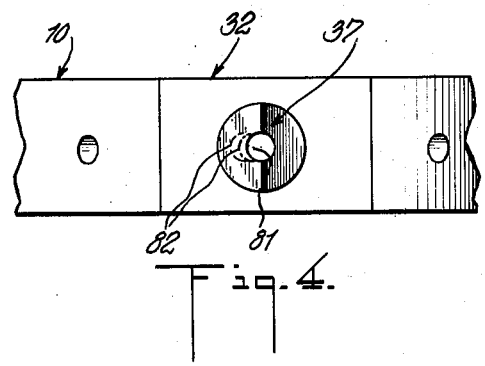
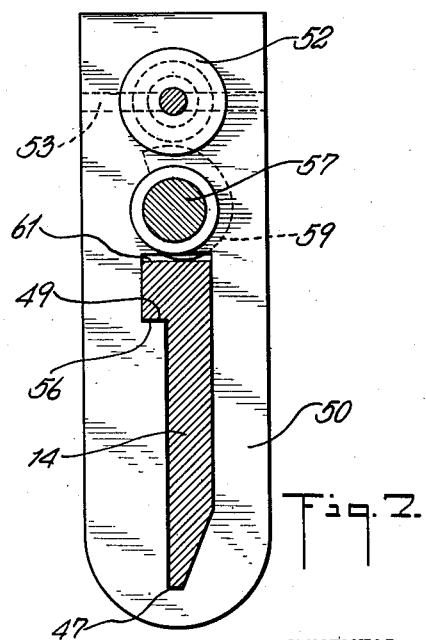
INVENTOR.
WILLIAM R. SCHMITZ, JR.
BY
Campbell, Brumbaugh, Free & Graves
ATTORNEYS INVENTOR.
WILLIAM R SCHMITZ, JR
BY
Campbell, Brumbaugh, Free & Graves
ATTORNEYS Patented Mar. 17, 1953

2,631,667

UNITED STATES PATENT OFFICE 2,631,667

STAPLE FIBER CUTTER

William R. Schmitz, Jr., Newark, N. J.

Application October 28, 1948, Serial No. 56,966

9 Claims. (Cl. 164—38)

The present invention relates to improvements in staple fiber cutters used for cutting continuous filamentary material into discontinuous lengths to produce staple fiber from rayon or other filamentary material.

The invention is directed particularly to improvements in the Beria type of fiber cutting apparatus in which the continuous filamentary material is fed to a rotating member having a radial channel through which the material is directed outwardly, generally under the influence of centrifugal force, and wherein the material is cut or sheared into staple lengths by a knife cooperating with the edge of the mouth or orifice of the channel at the periphery of the rotating member.

In most staple fiber cutters, the rotating member is in the form of a disk and the knife edge is allowed to bear against all, or at least a portion, of periphery thereof. The repeated and sharp impact of the filamentary material against the knife edge, particularly when the material is delustered rayon containing titanium dioxide, and the friction of the disk periphery against the knife edge, combine to wear the knife edge and the shearing edge of the orifice rapidly and to groove the knife edge and the disk periphery. As a result, the knife must be replaced every one or two weeks and all or part of the periphery of the rotating member must be reground or resurfaced at frequent intervals.

Many attempts have been made in the past to overcome the wear at these points and thereby avoid the frequent interruptions in operation that are required to replace the knives or resurface the rotating member. Thus, for example, the knife has been mounted for oscillation so that it comes into contact with the rotating member only at the time a filament is presented for cutting. This innovation has not proved advantageous in practice because the wear of the rotating member at the shearing edge of the radial channel and the wear of the knife edge due to repeated impact of the filaments are not diminished. Furthermore, the sustained pounding to which the knife is subjected by the filaments in the cutting action induces rapid wear of the linkages supporting the knife with the result that the knife is not held with sufficient firmness to insure proper cutting and maintenance of its proper position relative to the periphery of the disk.

Another disadvantage of the cutters now in operation is that the axial throat portion of the channel through which the filamentary material is fed is subject to rapid wear due to the abrasion of the entering filaments and the aerated acids entrained therewith.

Broadly considered, the present invention contemplates projecting the radial channel through which a continuous filament or tow of continuous filaments are conducted beyond the periphery of the disk or rotating member and in providing an elongated and adjustable knife capable of being securely locked in position for cutting the filamentary material.

This construction has a number of distinct advantages in that only the portion projecting from the periphery of the disk, and not the entire disk periphery, need be ground or resurfaced to reestablish or maintain the shearing edge of the orifice, the knife need not be replaced when the cutting edge is worn but need merely be adjusted to present a new portion thereof and the grooving action on the knife is reduced to a minimum.

In the preferred embodiment of the invention, the projection of the channel beyond the disk periphery is accomplished by means of a replaceable shear member having a tapered orifice that forms a continuation or extension of the radial channel. Furthermore the invention provides a replaceable throat portion for entry of the filamentary material into the radial channel, an enclosure for the rotatable disk member, and a comb member to intercept and deflect the cut filaments into a receptacle or conveyor means for further processing.

The details of construction of a preferred embodiment of the invention and the objects, utility and advantages thereof will become more apparent from the following detailed description made with reference to the accompanying drawing wherein:

Figure 3 is a plan view in cross section taken along section line 3—3 of Figure 1 showing the details of construction of a replaceable shear member and associated parts;

Figure 4 is a detailed view in elevation of a portion of the disk member containing the protruding orifice;

Figure 7 is a sectional plan view taken along section line 7—7 of Figure 5.

Figure 1:
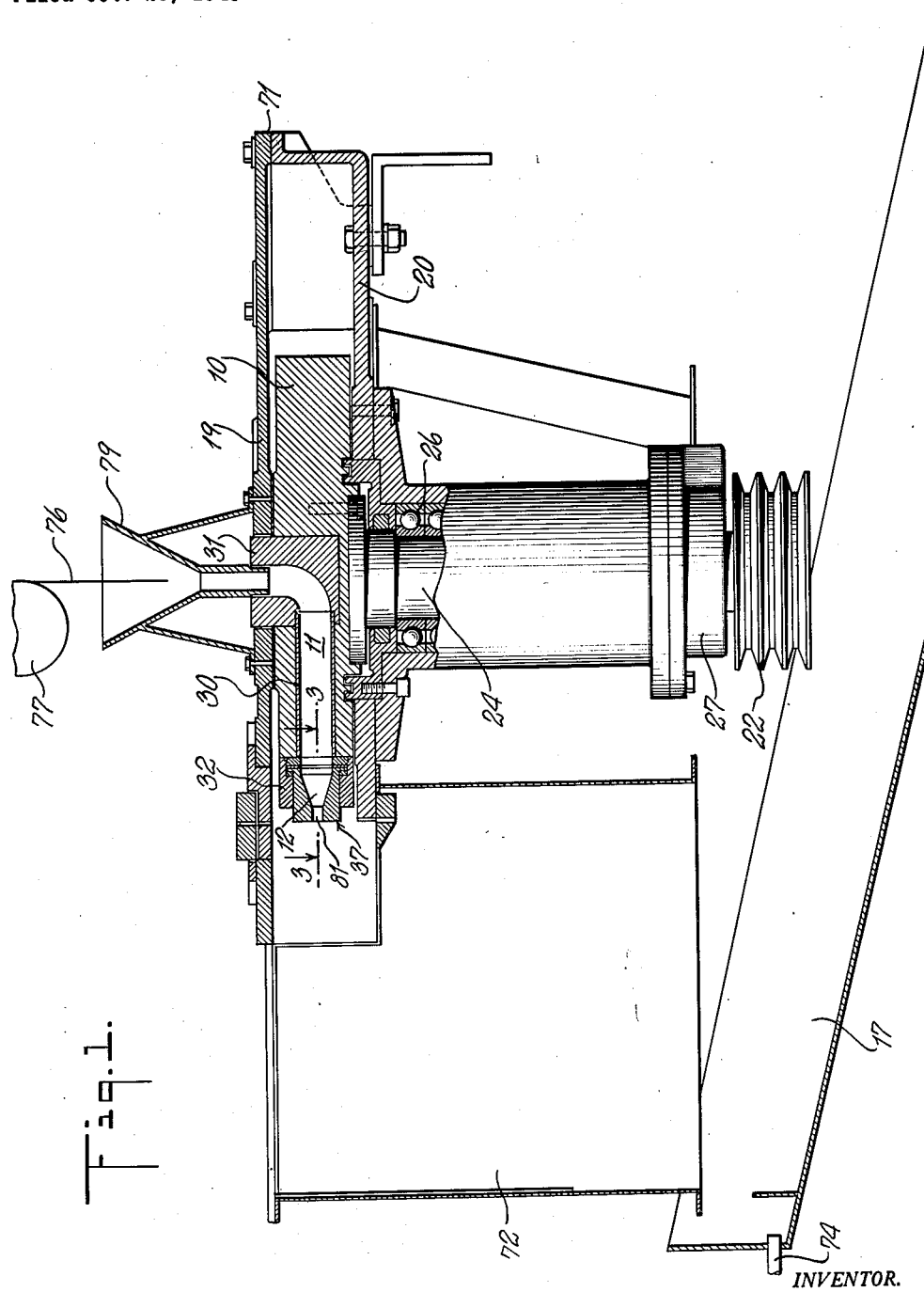
Figure 1 is a cross sectional view in elevation of a machine constructed in accordance with the preferred embodiments of the invention.

The embodiment of the machine selected for illustration in the drawing includes a rotatable disk member 10 having radial channel 11 therein terminating in a tapered channel 12, an adjustable knife 14, a comb member 16 and a trough 17 for carrying away the cut filaments. The disk member 10 is enclosed by upper and lower shroud members 19 and 20 and driven by any suitable means such as a belt in driving engagement with a pulley 22 mounted on a shaft 24 journaled in bearings 26 and 27.

The disk 10 is provided with a radial channel 11 which may, if desired, be lined as shown at 30, preferably with a non-corrosive material. At the axis of the disk 10 there is provided a recess for the reception of a replaceable throat member 31. The periphery of the disk 10, as shown more particularly in Figure 3, is cut out to receive a block 32 preferably having wedge shaped heel portions 33 at the inner end thereof and a curved portion 34 conforming to the curvature of the disk 10, the recess being located at the outer terminus of the channel 11. The block 32 is secured in the disk 10 by means of set screws 35 or the like and may be removed from the machine through an aperture 36 in the upper shroud plate 19.

A shear member 37 is mounted in block 32, its position being adjusted by means of shims 39 and 40 and being secured by a collar nut 41 that engages the internally threaded portions 42 of the block.

The shims 39 and 40 are selected to obtain the desired degree of projection of the shear member 37 beyond the periphery 44 of the disk and to make the collar nut 41 flush with the inner surface of the block 32, the purpose of the latter adjustment being to provide a substantially uninterrupted surface for the filamentary material as it passes through the radial channel 11 and into the channel 12.

The leading half of the shear member 37 is preferably tapered slightly at 46 to avoid all possibility of contact with the edge 47 of the knife 14. The trailing half 48 of the shear member 37 is preferably ground to have a radius of curvature extending to the axis of the disk 10. The inner walls of the shear member 37 are preferably tapered as shown for reasons pointed out in greater detail hereinafter.

Figure 5:
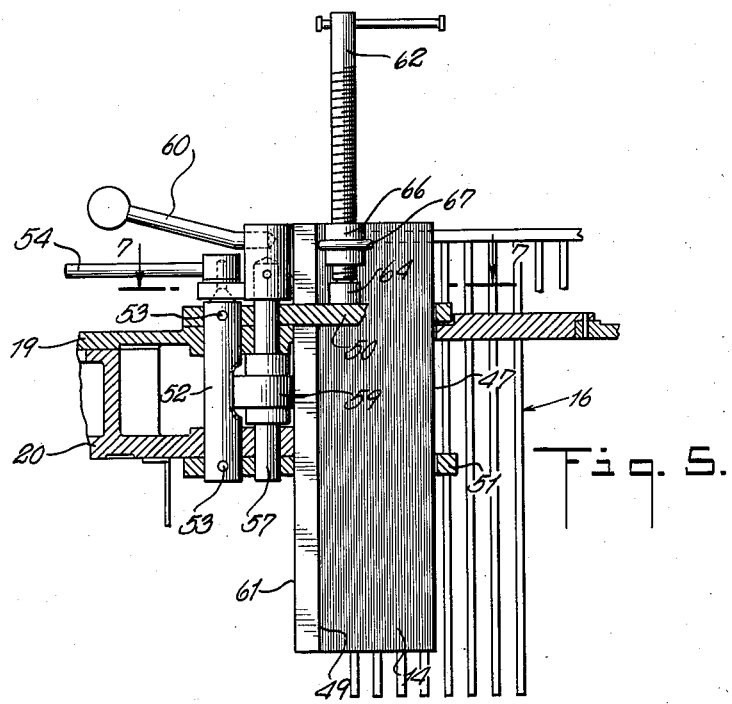
Figure 5 is a detailed view in elevation taken along section line 5—5 of Figure 2.

Referring now to Figures 5 and 7, the knife 14 is provided with a cutting edge 47 and a shoulder portion 49 and is supported by a pair of upper and lower plate members 50 and 51 joined together by a pivot rod 52 having keys or pins 53 adapted to maintain the upper and lower plate members in line with one another. The pivot rod 52 is securely fastened for rotation only to upper and lower shroud members 19 and 20 and is capable of being locked in position by means of a locking lever 54. The plate members 50 and 51 for the knife 14 are each provided with a recess including a shoulder portion 56. A tightening rod 57 having an eccentric portion 59 thereon extends between the upper and lower plate members 50 and 51. When the tightening rod is turned by actuation of lever 60 in a clockwise direction, as viewed in Figure 7, the eccentric portion 59 engages the back 61 of the knife and forces the shoulder 49 thereof against the shoulders 56 of the plate members 50 and 51. The locking action of eccentric 59, the shoulders 56 of the supporting members 50 and 51, and the resultant snug fit of the knife in said plate members all combine to hold the knife rigidly while the machine is in operation. Furthermore, the eccentric 59 and the pivot rod 52 provide supports for the knife that are directly in line with the direction of impact to which the knife is subjected and are, therefore, exposed to a minimum of wear.

Vertical adjustment of the knife is obtained, with tightening rod 57 rotated to a non-locking position, by adjustment of a vertical adjusting screw 62 mounted for rotation in a thrust bearing 64 and carrying a collar 66 secured to the knife by a U-bolt 67.

Figure 2:
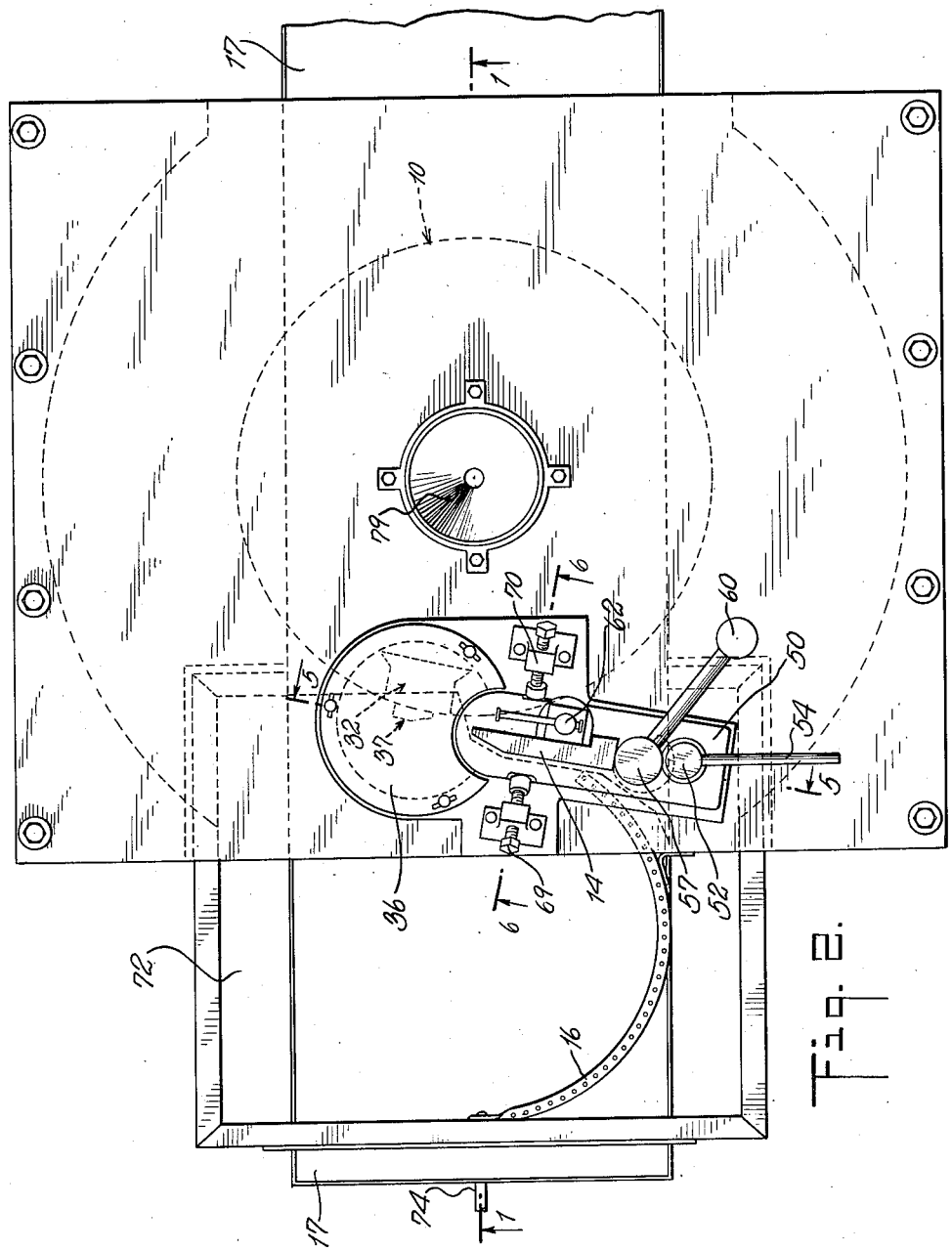
Figure 2 is a plan view of the machine illustrated in Figure 1.
Figure 6:
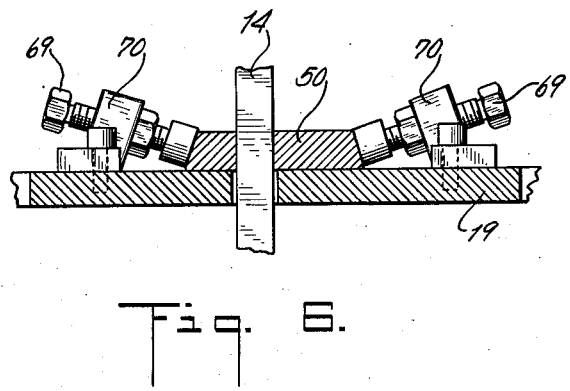
Figure 6 is a detailed view in elevation taken along section line 6—6 of Figure 2.

As shown in Figures 2 and 6, close adjustment of the position of the knife edge 47 with relation to the shear member 37 protruding from the periphery of the disk 10 is obtained by adjustment of a pair of adjusting screws 69 that engage the opposite edges of the upper plate member 50 and are rotatable in lugs 70 secured to the upper shroud 19 of the machine.

The upper shroud member 19 is joined to the lower shroud member 20 as shown at 71. The lower shroud member 20 is cut away at the entrance to a funnel 72 as shown best in Figure 2. The curved comb member 16, provided with vertical corrugations or the like, is positioned in the funnel 72, as shown in Figures 1 and 2, to deflect the cut particles of filamentary material into the inclined trough 17 supplied by a flow of liquid through line 74.

In operation, a tow 76 of continuous filaments from a source indicated generally at 77 is introduced into a funnel 79 while the disk 10 is rotated, the rate of feed of the tow being determined, if desired, by the speed or rotation of the disk 10. The tow proceeds through the channel 11 and the channel 12 and is cut into staple lengths by periodic engagement with the cutting edge 47 of the knife 14. The cut particles fly against the comb member 16 which, due to the small area of contact with the particles, does not retain them in spite of the surface tension and stickiness of the cut filaments. The cut filaments then drop into the trough 17 by means of which they are conveyed to the next operation.

Approximately every two weeks, the knife edge 47 at the point it makes contact with the tow of filaments will become worn. The rod 57 locking the knife 14 in place is then rotated to unlock the knife and the vertical adjusting screw 62 is actuated to bring a different portion of the edge 47 into contact with the tow of filaments. When the entire edge of the knife has been worn, it may be quickly and easily replaced.

When the shearing edge 80 of the shear member 37 becomes worn, the cylindrical orifice or mouth 81 of the channel 12 is ground, as indicated in phantom at 82 in Figures 3 and 4, each grinding operation being sufficient to present a new and sharp shearing edge 80. When the cutting member has been ground to the point where the wall of the mouth is in line with the wall of the channel 11, or at any time before, the curved face of the trailing half 48 may also be ground. This eliminates the necessity for grinding the entire periphery of the disk as is usually required in conventional apparatus.

When the throat portion 31 in the axis of the disk 10 becomes worn or corroded due to the abrasive and corroding action of the filaments therein, it can be removed and replaced with ease.

It is to be understood that the invention is not limited precisely to the details of construction as specifically disclosed herein with reference to the drawing and that innumerable alterations and modifications will at once occur to those skilled in the art upon reading this description. Thus, for example, more than one knife may be utilized as is conventional in the art. All such alterations and modifications are intended to be included within the scope of the invention as defined in the appended claims.

I claim:

1. A device for cutting continuous filamentary material to discontinuous lengths which comprises a rotatable disk member, a shear member having a curved face projecting from the periphery of the disk member, the trailing portion of said face having a radius of curvature extending to the axis of rotation of the rotatable disk member and the leading portion of said face being tapered toward said axis of rotation, a radial channel for the filamentary material within the disk member, one end of said channel communicating with a curved throat portion directed generally axially of the disk member and the other end extending through the shear member, and at least one cutting member for engaging and cutting, in cooperation with the shear member, filamentary material issuing therefrom.

2. A device for cutting a continuous filamentary material to discontinuous lengths which comprises a rotatable disk member, a shear member having a curved face projecting from the periphery of the disk member, the trailing portion of said face having a radius of curvature extending to the axis of rotation of the rotatable disk member and the leading portion of said face being tapered toward said axis of rotation, a radial channel within the disk member for the movement therethrough of filamentary material, one end of said channel communicating with a curved throat portion directed generally axially of the disk member and the other end extending through the shear member, a cutting member adjustably secured to engage and cut filamentary material issuing from said radial channel, and supporting means for the cutting member, said supporting means having a bearing surface abutting, and lying along the back of, the cutting member that is substantially perpendicular to and in line with the direction of the total reaction force applied to the cutting member by the filamentary material.

3. In a device for cutting continuous filamentary material to discontinuous lengths which includes a rotatable disk member, a radial channel within the disk member and a cutting member, the improvement which comprises a shear member in the disk member and projecting from the periphery thereof, said shear member having an orifice therein communicating with the radial channel and a face, the trailing portion of which has a radius of curvature extending to the axis of rotation of the rotatable disk member and the leading portion of which is tapered toward said axis of rotation.

4. In a device for cutting continuous filamentary material to discontinuous lengths which includes a rotatable disk member, a shear member having a curved face projecting from the periphery of the disk member, the trailing portion of said face having a radius of curvature extending to the axis of rotation of the rotatable disk member and the leading portion of said face being tapered toward said axis of rotation, a radial channel within the disk member, one end of said channel communicating with a curved throat portion directed generally axially of the disk member and the other end extending through the shear member, and a knife, the improvement which comprises an elongated knife, means for adjusting the position thereof relative to the curved trailing portion of the shear member, and means for supporting the knife in a plane substantially tangential to the periphery of the disk member, said supporting means having a bearing surface abutting, and lying along the back of, the knife that is substantially perpendicular to and in line with the direction of the total reaction force applied to the knife by the filamentary material.

5. A device for cutting continuous filamentary material to discontinuous lengths which comprises a rotatable disk member provided with a shear member projecting from the periphery of the disk member and having a curved face, the trailing portion of which has a radius of curvature extending to the axis of rotation of the rotatable disk member and the leading portion of which is tapered toward the axis of rotation, a radial channel for the filamentary material within the disk member, one end of said channel communicating with a curved throat portion directed generally axially of the disk member and the other end extending through the shear member, a cutting member having a cutting edge for engaging and cutting, in cooperation with the shear member, filamentary material issuing therefrom, and means to move the edge of the cutting member about an axis parallel to the axis of rotation, and outside the periphery, of the disk member and lock said cutting member non-resiliently in a given position relative to the disk member.

6. A device for cutting continuous filamentary material to discontinuous lengths which comprises a rotatable disk member provided with a shear member projecting from the periphery of the disk member and having a curved face, the trailing portion of said curved face having a radius of curvature extending to the axis of rotation of the rotatable disk member and the leading portion thereof being tapered toward said axis of rotation, a radial channel for the filamentary material within the disk member, one end of said channel communicating with a curved throat portion directed generally axially of the disk member and the other end extending through the shear member to the curved face thereof, a cutting member having a cutting edge for engaging and cutting, in cooperation with the shear member, filamentary material issuing therefrom, and means to move the edge of the cutting member in a plane perpendicular to the plane of the disk member.

7. A device for cutting continuous filamentary material to discontinuous lengths which comprises a rotatable disk member provided with a shear member projecting from the periphery of the disk member and having a curved face, the trailing portion of which has a radius of curvature extending to the axis of rotation of the rotatable disk member and the leading portion of which is tapered toward the axis of rotation, a radial channel for the filamentary material within the disk member, one end of said channel communicating with a curved throat portion directed generally axially of the disk member and the other end extending through the shear member, an elongated cutting member having a cutting edge for engaging and cutting, in cooperation with the shear member, filamentary material issuing therefrom, and means to move the edge of the cutting member about an axis parallel to the axis of rotation, and outside the periphery, of the disk member and lock said cutting member non-resiliently in a given position relative to the disk member.

8. A device for cutting continuous filamentary material to discontinuous lengths which comprises a rotatable disk member provided with a shear member projecting from the periphery of the disk member and having a curved face, the trailing portion of said curved face having a radius of curvature extending to the axis of rotation of the rotatable disk member and the leading portion thereof being tapered toward said axis of rotation, a radial channel for the filamentary material within the disk member, one end of said channel communicating with a curved throat portion directed generally axially of the disk member and the other end extending through the shear member to the curved face thereof, an elongated cutting member having a cutting edge for engaging and cutting, in cooperation with the shear member, filamentary material issuing therefrom, and means to move the edge of the cutting member in a plane perpendicular to the plane of the disk member.

9. A device for cutting continuous filamentary material to discontinuous lengths which comprises a rotatable disk member provided with a shear member projecting from the periphery of the disk member and having a curved face, the trailing portion of which has a radius of curvature extending to the axis of rotation of the rotatable disk member and the leading portion of which is tapered toward the axis of rotation, said shear member being formed with a tapered channel terminating in a cylindrical orifice of reduced diameter extending radially of the disk member, a radial channel for the filamentary material within the disk member, one end of said channel communicating with a curved throat portion directed generally axially of the disk member and the other end extending through the shear member, and a cutting member having a cutting edge for engaging and cutting, in cooperation with the shear member, filamentary material issuing therefrom.

WILLIAM R. SCHMITZ, Jr.

REFERENCES CITED

The following references are of record in the file of this patent:

UNITED STATES PATENTS

| Number | Name | Date |
|---|---|---|
| 227,452 | Steers | May 11, 1880 |
| 574,226 | Smith | Dec. 29, 1896 |
| 2,204,596 | Hughes | June 18, 1940 |
| 2,267,018 | Eckler et al. | Dec. 23, 1941 |
| 2,295,926 | Boesger | Sept. 15, 1942 |
| 2,314,069 | Blount | Mar. 16, 1943 |
| 2,323,644 | Castellan | July 6, 1943 |
| 2,394,603 | Folsom et al. | Feb. 12, 1946 |
| 2,407,109 | Smith | Sept. 3, 1946 |
| 2,426,757 | Wicker | Sept. 2, 1947 |
| 2,428,650 | Brunner | Oct. 7, 1947 |
| 2,446,097 | Nolson | July 27, 1948 |

FOREIGN PATENTS

| Number | Country | Date |
|---|---|---|
| 55,755 | Netherlands | Dec. 15, 1943 |
| 482,976 | Great Britain | Apr. 8, 1938 |